United States Patent
Axelsson

(10) Patent No.: US 8,505,483 B2
(45) Date of Patent: Aug. 13, 2013

(54) GRIPPER, A MILKING ROBOT AND A MILKING ARRANGEMENT

(75) Inventor: Thomas Axelsson, Farsta (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 13/696,840

(22) PCT Filed: Jun. 10, 2011

(86) PCT No.: PCT/EP2011/059680
§ 371 (c)(1),
(2), (4) Date: Nov. 8, 2012

(87) PCT Pub. No.: WO2011/157647
PCT Pub. Date: Dec. 22, 2011

(65) Prior Publication Data
US 2013/0061807 A1    Mar. 14, 2013

Related U.S. Application Data

(60) Provisional application No. 61/355,759, filed on Jun. 17, 2010.

(30) Foreign Application Priority Data

Jun. 17, 2010  (SE) ...................................... 1050621

(51) Int. Cl.
*A01J 7/00*  (2006.01)
(52) U.S. Cl.
USPC .................... 119/14.04; 119/14.03; 119/14.14
(58) Field of Classification Search
USPC .......... 119/14.04, 14.02, 14.03, 14.14, 14.47, 119/14.18, 14.08
See application file for complete search history.

(56) References Cited

U.S. PATENT DOCUMENTS

| | | | | |
|---|---|---|---|---|
| 4,838,207 | A * | 6/1989 | Bom et al. ................. | 119/14.02 |
| 5,020,477 | A * | 6/1991 | Dessing et al. ............ | 119/14.08 |
| 8,205,573 | B2 * | 6/2012 | Eriksson et al. ........... | 119/14.02 |
| 8,205,574 | B2 * | 6/2012 | Danneker et al. .......... | 119/14.47 |
| 2008/0022933 | A1 * | 1/2008 | Wase et al. ................. | 119/14.08 |

FOREIGN PATENT DOCUMENTS

| | | |
|---|---|---|
| EP | 0 270 165 A1 | 6/1988 |
| EP | 1 679 000 A2 | 7/2006 |
| RU | 1777550 A3 | 11/1992 |
| RU | 2 189 737 C2 | 9/2002 |

(Continued)

OTHER PUBLICATIONS

International-Type Search Report, dated Nov. 22, 2010, from corresponding PCT application.
International Search Report, dated Nov. 16, 2011, from corresponding PCT application.
Supplementary International Search Report, dated Jul. 12, 2012, from corresponding PCT application.

*Primary Examiner* — Yvonne Abbott
(74) *Attorney, Agent, or Firm* — Young & Thompson

(57) ABSTRACT

A milking arrangement in includes a milking robot with a gripper (10). The robot includes a base, a link arrangement attached to the base and rotatable around a base axis via a base joint. The gripper (10) has a proximal end and a distal end and is attached to the link arrangement at the proximal end. The gripper has an extension plane and a longitudinal center axis (x4) extending in the extension plane through the proximal end and the distal end. The longitudinal center axis divides the gripper in a primary side (10a) and a secondary side (10b). The gripper has a plurality of separate gripping recesses (11-14), each being configured to grip a respective teatcup. The gripping recesses are asymmetrically positioned with respect to the longitudinal center axis.

20 Claims, 3 Drawing Sheets

(56) References Cited

FOREIGN PATENT DOCUMENTS

| | | | |
|---|---|---|---|
| RU | 2 244 417 | C2 | 1/2005 |
| SE | 331611 | B | 1/1971 |
| SU | 1443861 | A1 | 12/1988 |
| SU | 1459644 | A1 | 2/1989 |
| WO | 00/04766 | A1 | 2/2000 |
| WO | 2008/118069 | A1 | 10/2008 |
| WO | 2010/014002 | A1 | 2/2010 |
| WO | 2010/060693 | A1 | 6/2010 |
| WO | 2010/110663 | A1 | 9/2010 |

* cited by examiner

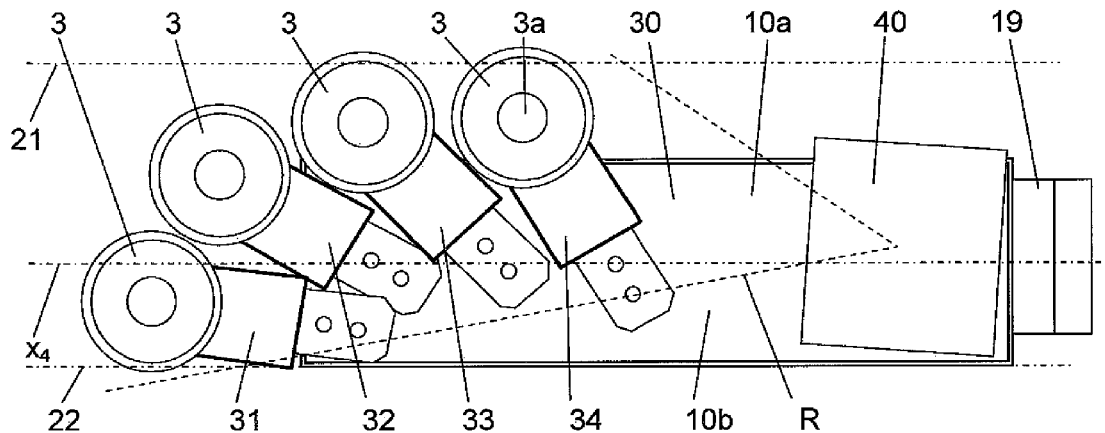
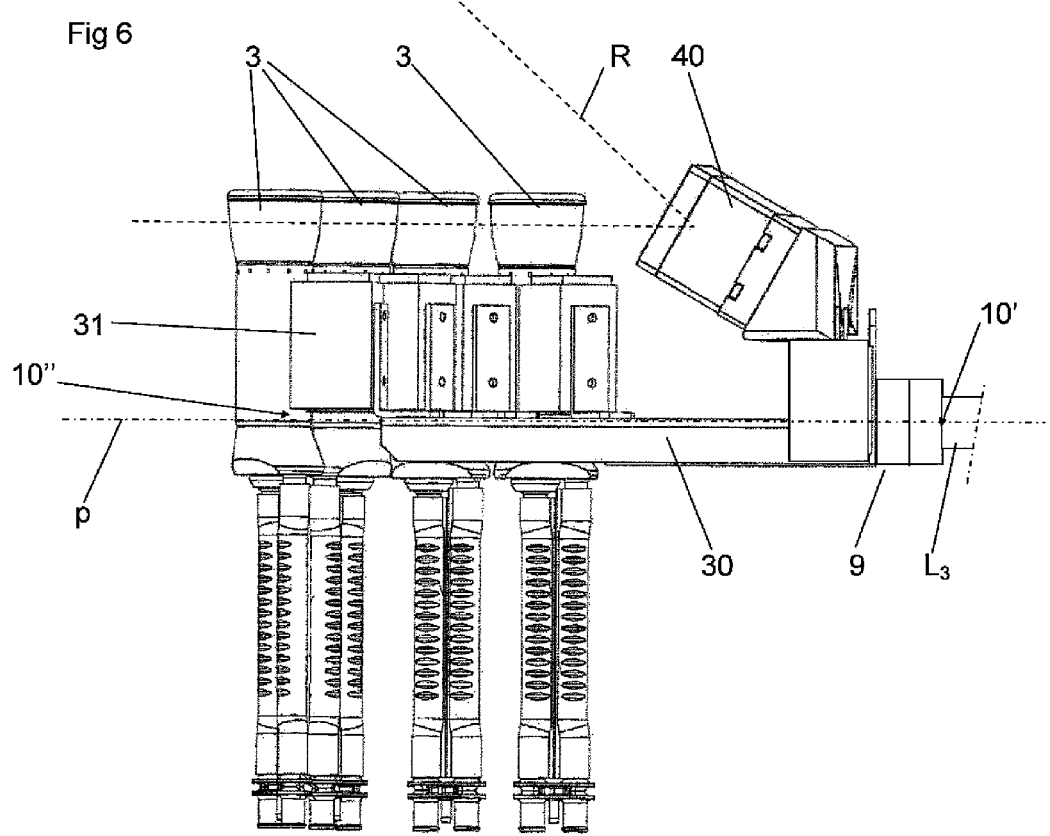

US 8,505,483 B2

GRIPPER, A MILKING ROBOT AND A MILKING ARRANGEMENT

THE FIELD OF THE INVENTION AND PRIOR ART

The present invention refers generally to automatic milking by means of a milking robot having a gripper, or end-effector, for gripping and holding the teatcups during the attachment of the teatcups to the teats of the animal to be milked. More precisely, the present invention refers to a gripper according to the preamble of claim 1. The invention also refers to a milking robot with a gripper, and to a milking arrangement comprising a milking parlour comprising a plurality of milking places, each being configured to house an animal to be milked and each being associated with a teatcup magazine holding a set of teatcups, and at least one milking robot with a gripper.

WO 00/04766 discloses a milking robot comprising a base, a link arrangement attached to the base and rotatable around a base axis via a base joint, and a gripper having a proximal end and a distal end and being attached to the link arrangement at the proximal end. The gripper has an extension plane and a longitudinal centre axis extending in the extension plane through the proximal end and the distal end. The longitudinal centre axis divides the gripper in a primary side and a secondary side. The gripper has four separate gripping recesses, each being configured to grip a respective teatcup.

WO 2010/014002 refers to different arrangements for automatic attachment of the teatcups to the teats of the animal. Various grippers are disclosed, such as grippers for gripping and holding two teatcups and grippers for gripping and holding four teatcups in longitudinal configuration along the longitudinal centre axis of the gripper or in a parallel trapezoid configuration.

SUMMARY OF THE INVENTION

The object of the present invention is to provide an improved gripper for a milking robot. A further object of the present invention is a gripper enabling simultaneous gripping of all the teatcups from a teatcup magazine. A still further object of the present invention is a gripper having relatively small dimensions.

This object is achieved by the milking robot initially defined which is characterized in that the gripping recesses are asymmetrically positioned with respect to the longitudinal centre axis so that at least three of the gripping recesses are mainly located on the primary side.

By means of such a positioning of the plurality of gripping recesses on the gripper of the milking robot, simultaneous gripping of the teatcups from a teatcup magazine is facilitated since the gripping recesses may be provided along a line having a straight or approximately straight extension, such as a slightly curved extension. The gripper according the invention may according to a first aspect be configured to grip simultaneously, or substantially simultaneously, two teatcups, and thus possibly but not necessarily have only two gripping recesses. According to a second aspect, the gripper may be configured to grip simultaneously, or substantially simultaneously, three teatcups, and thus possibly, but not necessarily, have only three gripping recesses. According to a third aspect, the gripper may be configured to grip simultaneously, or substantially simultaneously, four teatcups, and thus possibly, but not necessarily, have only four gripping recesses. The position of the teatcups in teatcup magazines is usually along a straight, or substantially straight, line so that the teatcups are easily gripped with substantially one movement by means of the gripper of the milking robot according to the invention. In addition, the asymmetric positioning of the teatcups makes it possible to configure the gripper with the teatcups to be relatively thin enabling introduction of the teatcups from behind the animal between the rear legs of the animal.

According to an embodiment of the invention, the gripping recesses are located at a successively larger distance from the proximal end. Advantageously, a first gripping recess of the gripping recesses is located at the distal end. The first gripping recess may then be suitable for gripping the teatcup to be attached first, preferably to one of the two forward teats of the animal.

According to a further embodiment of the invention, the gripper has four separate gripping recesses, wherein the gripping recesses are asymmetrically positioned with respect to the longitudinal centre axis so that at least three of the gripping recesses are mainly located on the primary side.

According to a further embodiment of the invention, a fourth gripping recess of the gripping recesses is located most closely to the proximal end, wherein a second gripping recess and a third gripping recess of the gripping recesses are located between the first gripping recess and the fourth gripping recess.

According to a further embodiment of the invention, each gripping recess has a centre line, which has a projection in the extension plane and along which the gripping recess is configured to approach and grip the teatcup, wherein the projections of the centre lines of the first gripping recess and the fourth gripping recess in the extension plane define an angle range in the extension plane, and wherein the angle range is equal to or less than 90°, preferably equal to or less than 80°, more preferably equal to or less than 70° or most preferably equal to or less than 60°. By arranging the gripping recesses so that their centre lines lie within a limited angle range, simultaneous gripping of all teatcups is facilitated or further facilitated. Advantageously, each of the centre lines of at least the second, the third and the fourth gripping recesses may then extend outwardly from the respective gripping recess and diverge from the longitudinal centre axis on the primary side.

According to a further embodiment of the invention, the first gripping recess is at least partly located on the secondary side. Advantageously, the gripper may have a primary border line on the primary side and a secondary border line on the secondary side, wherein the first gripping recess is located in the proximity of the secondary border line. The teatcup gripped by the first gripping recess may then form the outer border on the secondary side of the gripper.

According to a further embodiment of the invention, the gripper has an elongated shape with a length along the longitudinal centre axis that is significantly longer than a largest width along a direction perpendicular to the longitudinal centre axis. Such a shape of the gripper itself contributes further to the relatively thin width of the gripper with the teatcups gripped, so that the gripper and the teatcups may be easily introduced from behind between the rear legs of the animal.

According to a further embodiment of the invention, the gripper is rotatable around the longitudinal centre axis in relation to the link arrangement via a gripper joint. Such a rotary movement of the gripper is advantageous when the teacup magazine is configured to hold the teatcups in a position upside down, whereby the milking robot may rotate the teatcups after having been gripped by rotating the gripper 180° around the longitudinal centre axis to an upright position with the openings of the teatcups turned upwards and thus ready for being attached to a respective teat of the animal.

According to a further embodiment of the invention, the gripping recesses are located at the same level with respect to the extension plane.

According to a further embodiment of the invention, the milking robot comprises a sensor provided on the gripper between the proximal end and the gripping recesses. The sensor may include a video camera, a laser sensor, a time-of-flight camera, etc.

According to a further embodiment of the invention, the sensor has a limited viewing range which is dimensioned to include an upper part of all of the teatcups gripped by the gripping recesses. The positioning of the gripping recesses and the teatcups according to the invention facilitates the provision of the sensor so that the viewing range thereof may include or cover all the teatcups without the need of moving or rotating the sensor in relation to the gripper and/or the teatcups.

The object of the invention is also achieved by the milking robot initially defined, wherein the milking robot comprises a robot arm and a gripper. The milking robot may also comprise a base and a robot arm in the form of a link arrangement, which may be attached to the base and rotatable around a base axis via a base joint.

The object of the invention is also achieved by the milking arrangement initially defined, wherein the milking robot is configured to grip the teatcups held in the teatcup magazine simultaneously, or substantially simultaneously. Such a gripping may be performed by means of one single movement of the gripper towards the teatcups held in the teatcup magazine.

According to a further embodiment of the invention, the teacup magazine is configured to hold the teatcups in a position upside down, wherein the milking robot is configured to rotate, after the teatcups has been gripped, the teatcups by rotating the gripper 180° around the longitudinal centre axis.

According to a further embodiment of the invention, the milking parlour comprises a rotary platform with the milking places arranged so that the animals are standing in a radial direction with respect to a rotary centre axis of the rotary platform. In such a milking parlour the teatcups are preferably introduced from behind the animal between the rear legs of the animal.

BRIEF DESCRIPTION OF THE DRAWINGS

The present invention will now be explained more closely by means of a description of various embodiments and with reference to the drawings attached hereto.

FIG. 5 shows schematically a view from above of the gripper in FIGS. 1 and 2 with four teatcups.

FIG. 6 shows a side view of the gripper in FIG. 4.

DETAILED DESCRIPTION OF VARIOUS EMBODIMENTS OF THE INVENTION

Figure 1:
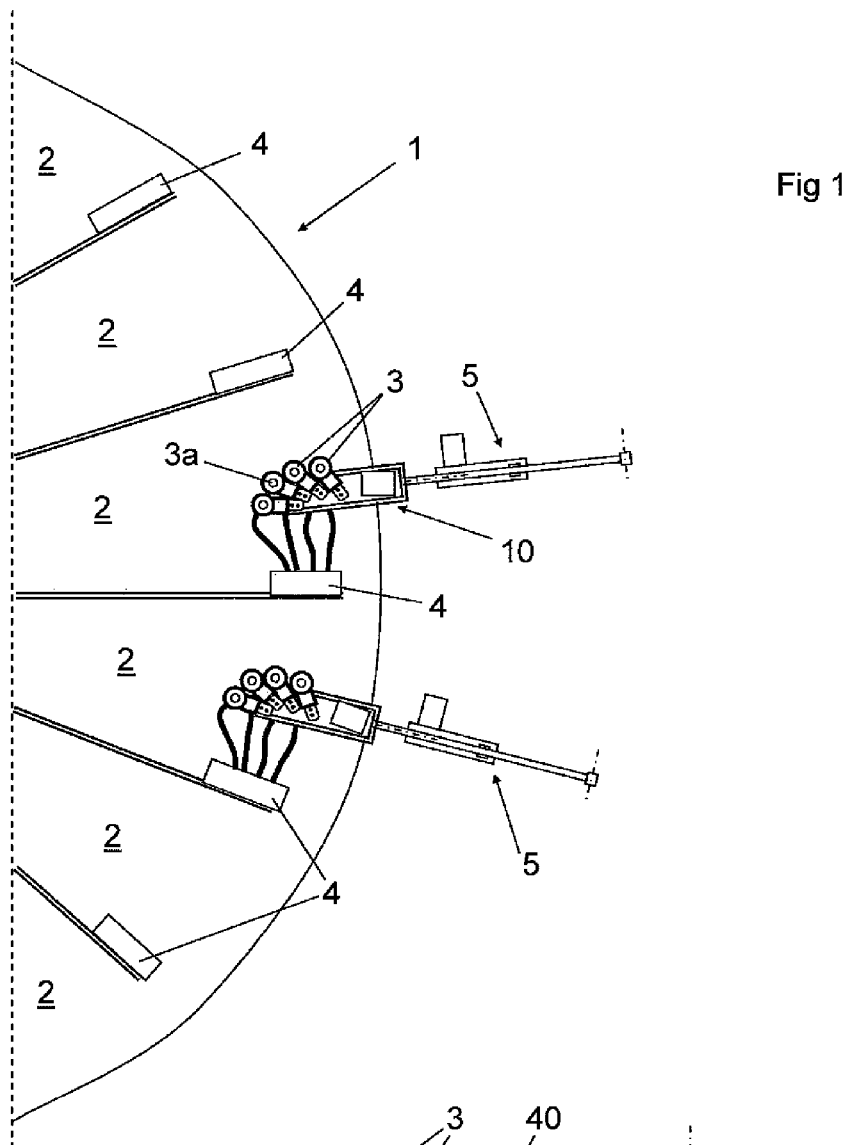
FIG. 1 shows schematically a view from above of a part of a milking arrangement.

FIG. 1 discloses a milking arrangement comprising a milking parlour. In the embodiment disclosed, the milking parlour comprises or is a so called Parallel Rotary Parlour having a rotary platform 1. It is to be noted that the milking parlour also may have another design. For instance, the milking parlour may be or comprise a stationary parlour, such as herringbone parlour or a parallel parlour. The milking parlour may also be configured with one milking place for one single animal.

The rotary platform 1 disclosed comprises a plurality of milking places 2 arranged in an annular configuration on the rotary platform 1 and each being designed to house an animal to be milked. The milking places 2 are arranged so that the animals are standing in a radial direction with respect to a rotary centre axis of the rotary platform 1.

Each milking place 2 comprises a milking machine (not disclosed) comprising a milking member having a number of teatcups 3. In the embodiment disclosed, the milking member comprises four teatcups 3 to be introduced from behind the animal between the rear legs of the animal.

Each milking place 2 is associated with or comprises a teatcup magazine 4 configured to hold the teatcups 3 during the time period between the milking operations. The teatcups 3 are held in an upside down position in the teatcup magazine 4, i.e. the opening 3a of the teatcup 3 is turned downwards when the teatcup 3 is held in the teatcup magazine 4. It is to be noted that the teatcup magazine 4 may also be configured to hold the teatcups in other orientations, such as with the openings 3a turned upwards.

The milking arrangement disclosed also comprises two milking robots 5 for gripping the teatcups 3 form the teatcup magazine 4 and attach them to the teats of an animal to be milked. The milking arrangement may of course comprise only one or more than two milking robots 5.

Figure 2:
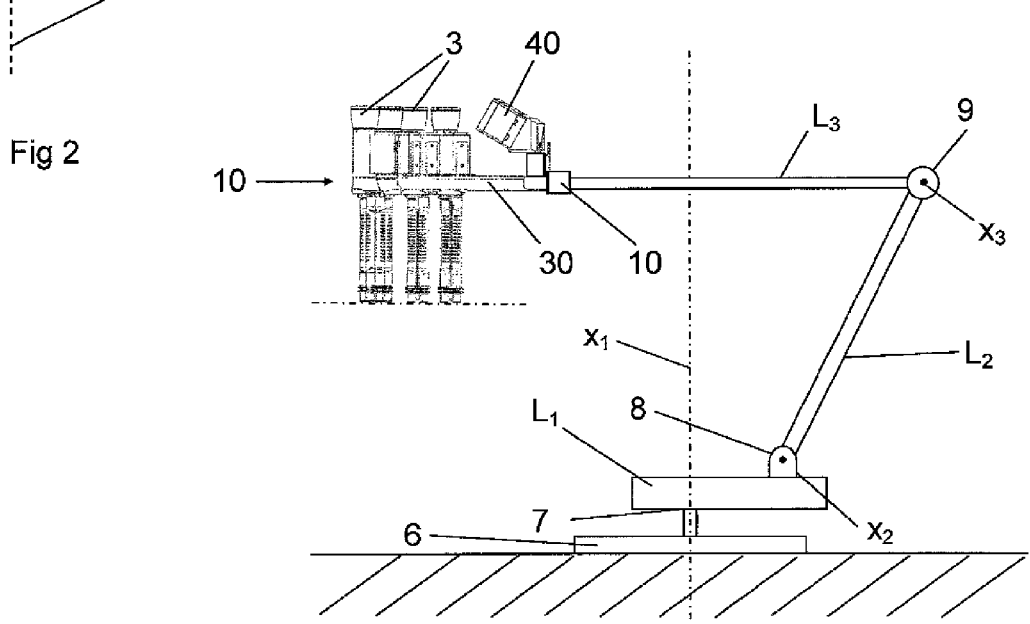
FIG. 2 shows schematically a side view of a milking robot of the milking arrangement in FIG. 1.

Each of the milking robots 5, see FIG. 2, comprises a robot arm. In the embodiment disclosed, the milking robot 5 also comprises a base 6, wherein the robot arm comprises a link arrangement attached to the base 6 and rotatable around a base joint axis x, via a base joint 7. In the embodiment disclosed, the base joint axis $x_1$ is vertical. The base 6 may be mounted to the floor, to another link or to a rail enabling movement of the base 6 in relation to the rotary parlour 1.

Furthermore, it is to be noted that the link arrangement may be configured in various ways. In the embodiment disclosed, the link arrangement, as an example, comprises a first link $L_1$, a second link $L_2$ and a third link $L_3$. The first link $L_1$ is attached to the base 6 and rotatable around the base joint axis $x_1$ to a first angle within a first angle range via the base joint 7 by means of a first joint actuator (not shown). The second link $L_2$ is attached to the first link $L_1$ and rotatable around a second axis $x_2$ to a second angle within a second angle range via a second joint 8 by means of a second joint actuator (not shown). The third link $L_3$ is attached to the second link $L_2$ and rotatable around the third axis $x_3$ to a third angle within a third angle range via a third joint 9 by means of a third joint actuator (not shown).

Each milking robot 5 also comprises a gripper 10, or end-effector. The gripper 10 is disclosed more closely in FIGS. 3-6 and has a proximal end 10' and a distal end 10". The gripper 10 is attached to third link $L_3$ of the link arrangement at the proximal end 10'. The gripper 10 has an extension plane p and a longitudinal centre axis $x_4$ extending in the extension plane p through the proximal end 10' and the distal end 10".

The gripper 10 is rotatable around the longitudinal centre axis $x_4$ so that the longitudinal centre axis $x_4$ form a rotary axis of the gripper 10. Especially, the gripper 10 is rotatable around the longitudinal centre axis $x_4$ in relation to the third link $L_3$ of the link arrangement via a gripper joint 19.

The gripper 10 has, in the embodiments disclosed, four separate gripping recesses 11-14, i.e, a first gripping recess 11, a second gripping recess 12, a third gripping recess 13 and a fourth gripping recess 14. Each gripping recess 11-14 is configured to grip and hold a respective teatcup 3. Each gripping recess 11-14 has a respective centre line 15-18, see FIG. 3. Each centre line 15-18 has a projection in the extension plane p. In the embodiments disclosed, the centre lines 15-18 of the gripping recesses 11-14 are all located in the extension plane p, but it is to be noted that on, more or all of the centre lines may be inclined or displaced in relation to the extension plane p. Each gripping recess 11-14 is configured to approach and grip the teatcup 3 along the respective centre line 15-18. The gripping recesses 11-14 are located at the same level with respect to the extension plane p.

It is also to be noted that the invention is also applicable to grippers having two, three, five or more gripping recesses. In case of a gripper with two gripping recesses, these are provided asymmetrically so that both of the gripping recesses are located on the primary side of the gripper. In the case of three gripping recesses two or three of the gripping recesses may be located on the primary side.

The longitudinal centre axis $x_4$ divides the gripper 10 in a primary side 10a and a secondary side 10b. The gripping recesses 11-14 are asymmetrically positioned with respect to the longitudinal centre axis $x_4$ so that at least three 12-14 of the gripping recesses 11-14 are mainly located on the primary side 10a.

The gripping recesses 11-14 are located at a successively larger distance from the proximal end 10'. The first gripping recess 11 of the gripping recesses 11-14 is located at the distal end 10". The fourth gripping recess 14 of the gripping recesses 11-14 is located most closely to the proximal end 10". The second gripping recess 12 and the third gripping recess 13 of the gripping recesses 11-14 are located between the first gripping recess 11 and the fourth gripping recess 14.

Figure 3:
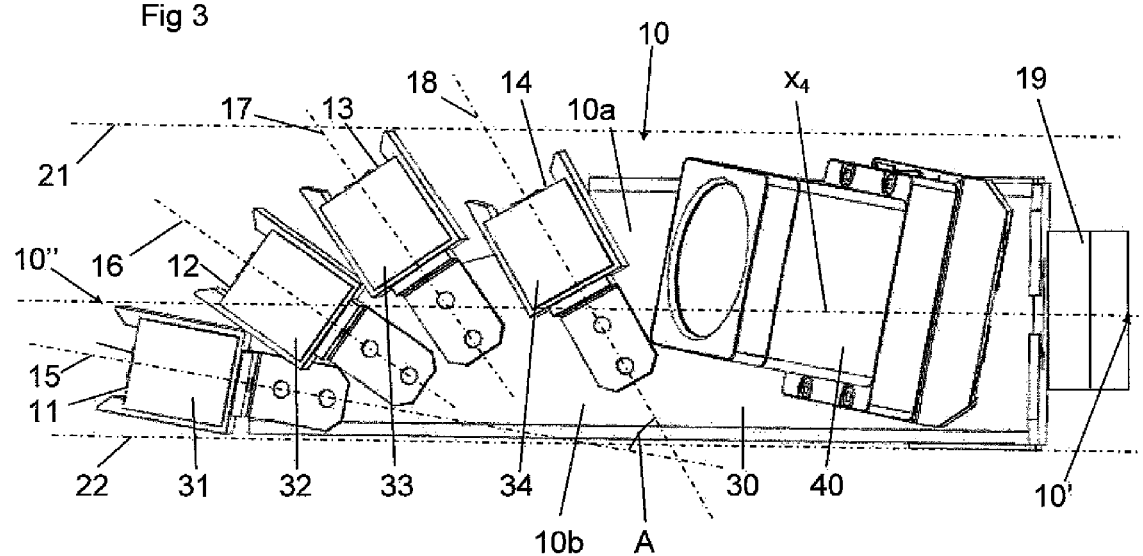
FIG. 3 shows schematically a view from above of a gripper of the milking robot in FIG. 2.
Figure 4:
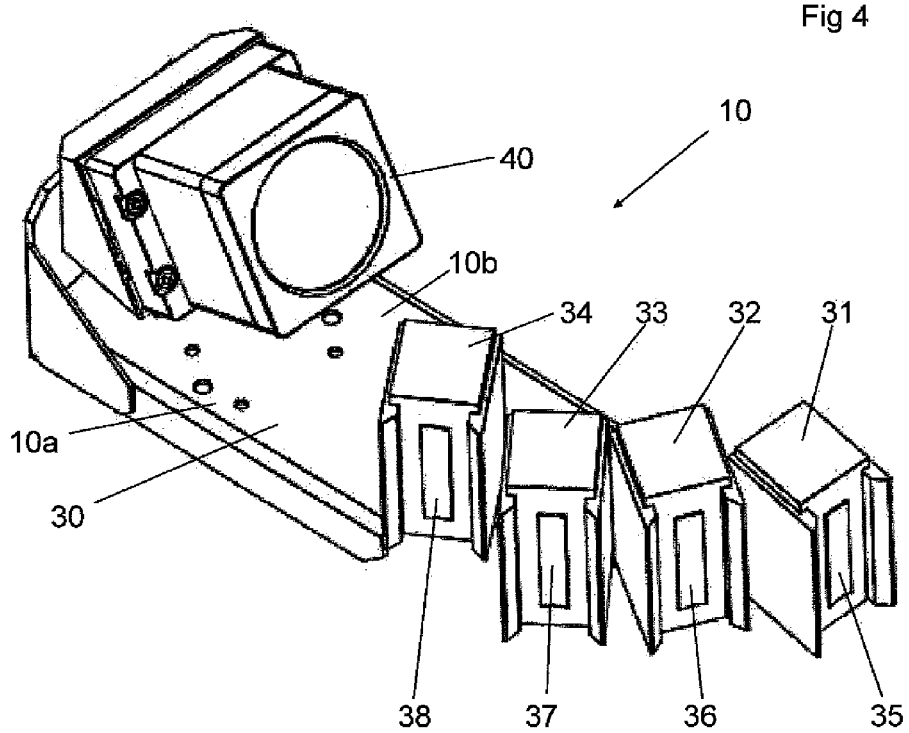
FIG. 4 shows schematically a perspective view of the gripper in FIG. 3.

The centre line 15 of the first gripping recess 11 and the centre line 18 of the fourth gripping recess 14, or the projections of the centre lines 15 and 18 in the extension plane p, define an angle range A in the extension plane p, see FIG. 3. The angle range A is equal to or less than 90°, preferably equal to or less than 80°, more preferably equal to or less than 70°, and most preferably equal to or less than 60°.

As can be seen in FIGS. 3 and 5, each of the centre lines 15-18 of the first, the second, the third and the fourth gripping recesses 11-14 extends outwardly from the respective gripping recess 11-14 and diverges from the longitudinal centre axis $x_4$ on the primary side 10a. Moreover, the first gripping recess 11 is in the embodiment disclosed located on the secondary side 10b. The first gripping recess 11 may at least partly be located on the primary side 10a. Moreover, the centre line 15 of the first gripping recess 11 may diverge from the longitudinal centre axis $x_4$ on the secondary side $10_b$.

As can also be seen in FIG. 5, the gripper has primary border line 21 on the primary side 10a and a secondary border line 22 on the secondary side 10b, schematically indicated in FIGS. 3 and 5. The primary border line 21 and the secondary border line 22 are both parallel with the longitudinal centre axis $x_4$. The first gripping recess 11 is located in the proximity of the secondary border line 22, and in the embodiment disclosed, defines the position of the secondary border line 22. The teatcup 3 held by the first gripping recess 11 lies slightly outside the secondary border line 22.

The gripper 10 has an elongated shape with a length along the longitudinal centre axis $x_4$ that is significantly longer than a largest width along a direction perpendicular to the longitudinal centre axis $x_4$. In the embodiment disclosed, the gripper includes a body 30 in the form of an elongated plate extending in parallel with the extension plane p. Each gripping recess 11-14 is formed in a respective gripping element 31-34 which are mounted to the body 30 in a respective fixed position on the body 30. Each gripping element 31-34 has an electromagnet 35-38 provided in the respective gripping recess 11-14, see FIG. 4. By energizing the electromagnet 35-38, the teatcup 3, having a shell of magnetic material, may be gripped and held. The electromagnet 35-38 may be replaced by other means, for instance a pair of jaws or a pneumatic suction nozzle.

The milking robot 5 also comprises a sensor 40 provided on the gripper 10, and mounted to the body 30, between the proximal end 10' and the gripping recesses 11-14. The sensor 40 has a limited viewing range R which is dimensioned to include an upper part of all of the teatcups 3 gripped by the gripping recesses 11-14. The sensor 40 may include a video camera, a laser sensor, a time-of-flight camera, etc.

In use, the milking robot 5, according to the embodiments disclosed, is configured to grip the teatcups 3, usually four teatcups, held upside down in the teatcup magazine 4 by turning the gripper 10 180° with the sensor 40 turned downwards and then moving the gripper 10 along a substantially straight path towards the teatcup magazine 4 in such way the four gripping recesses 11-14 are approaching and engaging all four teatcups 3 simultaneously, or substantially simultaneously. The electromagnets 35-38 are energized and the teatcups 11-14 are held in the gripper 10.

The milking robot 5 then withdraws the gripper 10 and the teatcups 3 from the teatcup magazine 4 and rotate the gripper 180° so that the teatcups 3 are positioned with the openings 3a turned upwards. The gripper 10 and the teatcups 3 are moved along a path, preferably between the rear legs of the animal, towards the udder and the teats of the animal. The teatcups 3 are then attached successively to the teats of the animal.

A possible order of attachment would, for instance, be the following:
1) attachment of the teatcup 3 held in the fourth gripping recess 14 to the rearward right teat,
2) attachment of the teatcup 3 held in the third gripping recess 13 to the forward right teat,
3) attachment of the teatcup 3 held in the second gripping recess 12 to the forward left teat, and
4) attachment of the teatcup 3 held in the first gripping recess 11 to the rearward left teat.

Of course other orders of attachment are possible within the scope of the invention.

The present invention is not limited to the embodiments described but may be varied and modified within the scope of the claims.

The invention claimed is:

1. A gripper (10) configured for a milking robot, the gripper comprising:
   a proximal end (10') configured to be attached to the milking robot (5);
   a distal end (10");
   an extension plane (p) extending through the proximal end and the distal end;
   a longitudinal center axis (x4) extending in the extension plane (p) through the proximal end and the distal end,
   the longitudinal center axis (x4) dividing the extension plane (p) into a primary side (10a) and a secondary side (10b) with a primary border line (21) on the primary side (10a) and a secondary border line (22) on the secondary side (10b);
   a body (30) connected to the proximal end, a longitudinal length of the body extending with the longitudinal center axis (x4);

a plurality of separate gripping elements (31-34) mounted to the body, the gripping elements located one adjacent another along the length of body, wherein the gripping elements each have a respective separate gripping recess (11-14), each gripping recess configured to grip a different respective teatcup (3), each gripping recess having an opening to accept the respective teatcup, the openings of at least two adjacent gripping recesses facing the primary border line (21), wherein each gripping recess has a respective center line (15-18), each center line having a respective projection extending from the gripping element, through the opening, and intersecting the longitudinal center axis (x4), and wherein the gripping recesses are asymmetrically positioned with respect to the longitudinal center axis (x4).

2. The gripper according to claim 1, further comprising:
a gripper joint (19) located at the proximal end, the gripper joint rotatable about the longitudinal center axis (x4), the body rotatable about the longitudinal center axis (x4) via operation of the gripper joint.

3. The gripper according to claim 2, wherein,
a first of the gripping elements is located closest to the proximal end and a last of the gripping elements is located furthest from the proximal end, and
a first angle form by the center line projection of the first gripping element and the longitudinal center axis (x4) is greater than a second angle form by the center line projection of the last gripping element and the longitudinal center axis (x4).

4. The gripper according to claim 3, wherein,
an angle formed between the center line projection of the first gripping element and the center line projection of the last gripping element is equal to or less than 90°.

5. The gripper according to claim 1, wherein,
the gripper (10) has four gripping elements and four gripping recesses.

6. The gripper according to claim 5, wherein,
at least three of the gripping recesses (11-14) are mainly located on the primary side (10a).

7. The gripper according to claim 6, wherein,
a first, second, and third of the gripping recesses (12-14) are located one adjacent another from the proximal end and each extend over the longitudinal center axis, and
a fourth of the gripping recesses (17) is located at the distal end and does not extend over the longitudinal center axis.

8. The gripper according to claim 5, wherein,
a first (14) of the gripping recesses (11-14) is located most closely to the proximal end (10'),
a second (13) of the gripping recesses (11-14) is located adjacent the first gripping recess (14),
a third (12) of the gripping recesses (11-14) is adjacent the second gripping recess (13) so located between the first and third gripping recesses (12, 13), and
a fourth (11) of the gripping recesses (11-14) is located adjacent the third gripping recess (12) and nearest the distal end (10").

9. The gripper according to claim 8,
a second gripping recess (13) is located nearest to the primary border line (21), and
a fourth gripping recess (11) is located nearest the secondary border line (22).

10. The gripper according to claim 5, wherein at least one gripping recess (11) is at least partly located on the secondary side (10b).

11. The gripper according to claim 5, in combination with a teatcup magazine (4) holding a set of four teatcups (3), and the milking robot,
wherein the four recesses are located to enable the milking robot to simultaneous grip four teatcups from the teatcup magazine.

12. The gripper according to claim 11, further comprising:
a gripper joint (19) located at the proximal end, the gripper joint rotatable about the longitudinal center axis (x4), wherein,
the teacup magazine (4) is configured to hold the teatcups (3) in a position upside down,
the milking robot (5) is configured to rotate, after the teatcups (3) has been gripped, the teatcups (3) by rotating the gripper (10) 180° around the longitudinal center axis (x4).

13. The gripper of claim 12 in combination with a milking parlour comprises a rotary platform (1) with the milking places (5) arranged so that the animals, during milking, stand in a radial direction with respect to a rotary center axis of the rotary platform (1).

14. The gripper according to claim 1, wherein each of the gripping recesses (11-14) are located at a common level with respect to the extension plane (p).

15. The gripper according to claim 1, further comprising:
a sensor (40) provided located between the proximal end (10') and the gripping recesses (11-14).

16. The gripper according to claim 15, wherein the sensor (40) has a viewing range (R) dimensioned to include an upper part of all of the teatcups (3) gripped by the gripping recesses (11-14).

17. The gripper according to claim 1, in combination with the milking robot and a rotary parlour,
the gripper (10) further comprising a gripper joint (19) located at the proximal end, the gripper joint rotatable about the longitudinal center axis (x4), and
the milking robot comprising
a base (6) configured to be mounted to one of i) a location stationary relative to the rotary parlour, and ii) an element enabling movement of the base in relation to the rotary parlour,
a first link (L1) attached to the base and rotatable around a base joint axis (x1) via a first joint (7),
a second link (L2) attached to the first link (L1) and rotatable around a second axis (x2) via a second joint (8), and
a third link (L3) attached to the second link (L2) and rotatable around a third axis (x3) via a third joint (9), the gripper joint (19) connected to the third link (L3),
wherein the milking robot (5) is configured to rotate via the gripper joint (19), after the teatcups (3) has been gripped, the teatcups (3) by rotating the gripper (10) 180° around the longitudinal center axis (x4).

18. The gripper according to claim 17, in combination with the milking robot and a rotary parlour, wherein
the base joint axis (x1) extends vertically from the base,
the second axis (x2) extends horizontally, and
the third axis (x3) extends horizontally.

19. The gripper according to claim 1, wherein,
all the openings face the primary border line (21).

20. The gripper according to claim 1, wherein, the respective projections of each of the center lines of the gripping recesses and the longitudinal center axis (x4) form mutually different angles.

* * * * *